(12) United States Patent
Sobolevskiy

(10) Patent No.: US 8,790,609 B1
(45) Date of Patent: Jul. 29, 2014

(54) METHOD OF YELLOW PLUME ELIMINATION IN GAS TURBINE EXHAUST

(71) Applicant: Anatoly Sobolevskiy, Orlando, FL (US)

(72) Inventor: Anatoly Sobolevskiy, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/928,461

(22) Filed: Jun. 27, 2013

(51) Int. Cl.
C01B 21/24 (2006.01)

(52) U.S. Cl.
CPC ................................. C01B 21/24 (2013.01)
USPC ........................................ 423/402; 423/405

(58) Field of Classification Search
CPC ..................................................... C01B 21/24
USPC .................................................. 423/402, 405
See application file for complete search history.

(56) References Cited

U.S. PATENT DOCUMENTS

| | | | | |
|---|---|---|---|---|
| 2,382,189 | A | * | 8/1945 | Wahl .............................. 423/405 |
| 3,512,925 | A | * | 5/1970 | Buechler et al. .............. 423/219 |
| 3,705,231 | A | * | 12/1972 | Biberacher ................. 423/239.1 |
| 5,505,919 | A | * | 4/1996 | Morii et al. ................. 423/213.5 |
| 7,390,471 | B2 | | 6/2008 | Sobolevskiy et al. |
| 7,695,703 | B2 | | 4/2010 | Sobolevskiy et al. |
| 7,718,153 | B2 | | 5/2010 | Sobolevskiy et al. |
| 7,744,840 | B2 | | 6/2010 | Sobolevskiy et al. |
| 7,976,805 | B2 | | 7/2011 | Sobolevskiy et al. |
| 7,988,940 | B2 | | 8/2011 | Sobolevskiy et al. |
| 2004/0042947 | A1 | | 3/2004 | Hoard et al. |
| 2008/0299016 | A1 | | 12/2008 | Sobolevskiy et al. |
| 2010/0126143 | A1 | | 5/2010 | Cho |
| 2010/0300061 | A1 | | 12/2010 | Sobolevskiy et al. |
| 2010/0303697 | A1 | | 12/2010 | Sobolevskiy et al. |
| 2012/0107207 | A1 | | 5/2012 | Winkler et al. |

FOREIGN PATENT DOCUMENTS

EP 0945179 A2 * 9/1999 ............. C01B 21/24

OTHER PUBLICATIONS

Bamwenda et al., Effect of Conversion of NO2 Into NO on the Catalytic Reduction of NO2 with C3H6 in Excess O2, React. Kinet. Catal. Lett. 63:1 pp. 53-59 (1998).
Olsen, DB, et al., Impact of oxidation catalysts on exhaust NO2/NOx ratio from lean-burn natural gas engines, J Air Waste Manag Assoc. Jul. 2010; 60(7): 867-74 (Abstract only).
Madia, G., et al., Ind. Eng. Chem. Res., 2002, 41(16), pp. 4008-4015 (Abstract only).
Lu, M.-H., Li M.-S., Shan, Y.-H., Seshan, K. and Lefferts, L. (2008), Reduction of NO2 in Flue Gas by CO and Propylene over CuO-CeO2/SiO2 in the Presence of O2. Chin. J. Chem., 26: 1035-1040. doi: 10.1002/cjoc.200890184 (Abstract only), Jun. 2008.
Montes, et al., Lean Selective Catalytic Reduction of NO2 by Methane over CO-Zeolites, Catalysis Letters, 53 (3-4), 1998, pp. 204-210(6) (Abstract only).

* cited by examiner

Primary Examiner — Timothy Vanoy

(57) ABSTRACT

A process for reducing nitrogen dioxide ($NO_2$) to nitric oxide (NO) in a $NO_2$-containing gaseous stream is provided. The process includes contacting the gaseous stream (12) with a catalyst system (28) comprising a catalyst selected from a platinum group metal. The contacting is done in the presence of carbon monoxide (22) and an organic compound (24), which synergistically improves $NO_2$ reduction efficiency, particularly at low operating temperatures.

20 Claims, 2 Drawing Sheets

METHOD OF YELLOW PLUME ELIMINATION IN GAS TURBINE EXHAUST

FIELD OF THE INVENTION

The present invention relates to pollutant control and more particularly to methods and systems for the reduction of nitrogen dioxide ($NO_2$) to nitric oxide (NO) in a $NO_2$-containing gaseous stream.

BACKGROUND OF THE INVENTION $NO_x$ generally refers to a mixture of nitric oxide (NO), nitrogen dioxide ($NO_2$) and nitrous oxide ($N_2O$). The lifespan of $NO_x$ components in the atmosphere typically ranges from one to seven days for NO and $NO_2$, and to 170 years for $N_2O$. NO has no color, odor, or taste, and is relatively non-toxic. In the presence of air, NO is rapidly oxidized to $NO_2$. $NO_2$ is a reddish brown pollutant with high reactivity. $NO_2$ is also a strong oxidizing agent that can form the corrosive nitric acid, as well other toxic organic nitrates. Further, $NO_2$ is a well-known pulmonary irritant affecting the human respiratory system, which may exacerbate asthma and other respiratory conditions. Still further, $NO_2$ absorbs light, is a main component of smog, and is sometimes seen as the yellow-brown haze hanging over cities or as the yellow plume in the stack downstream of a gas turbine. In such instances, $NO_2$ may be found in concentrations above 10-12 ppm.

Numerous technologies exist to reduce $NO_x$ components in gaseous streams, particularly exhaust streams from the combustion of fuel. Many of those solutions primarily focus on the reduction of the $NO_x$ components down to $N_2$. Moreover, $NO_2$ tends to be more abundant in exhaust streams at start up, lower temperatures, and part loads. The reduction of $NO_2$ to NO ($NO_2 \rightarrow NO + \frac{1}{2}O_2$), however, is poorly understood and controlled. In one study, Bamwenda et al., React. Kinet. Catal. Lett. 63:1 pp. 53-59 (1998) examined the reduction of $NO_2$ by $C_3H_6$ in the presence of $O_2$ over alumina-supported Au, Rh and Pt. The authors, however, only achieved a reduction efficiency of up to 50% at 400° C. before gradually falling off with temperature. Further, a drawback of injecting a substantial amount of an organic compound into an exhaust stream is the formation of hydrocarbons and other byproducts that need to be treated in order to comply with environmental regulations, as well as any excess of the organic compound itself in the stream. Improved solutions for reducing $NO_2$ to NO are thus needed to reduce $NO_2$ to NO with higher efficiency without generating significant pollutants.

BRIEF DESCRIPTION OF THE DRAWINGS

The invention is explained in the following description in view of the drawings that show.

DETAILED DESCRIPTION OF THE INVENTION

Figure 1:
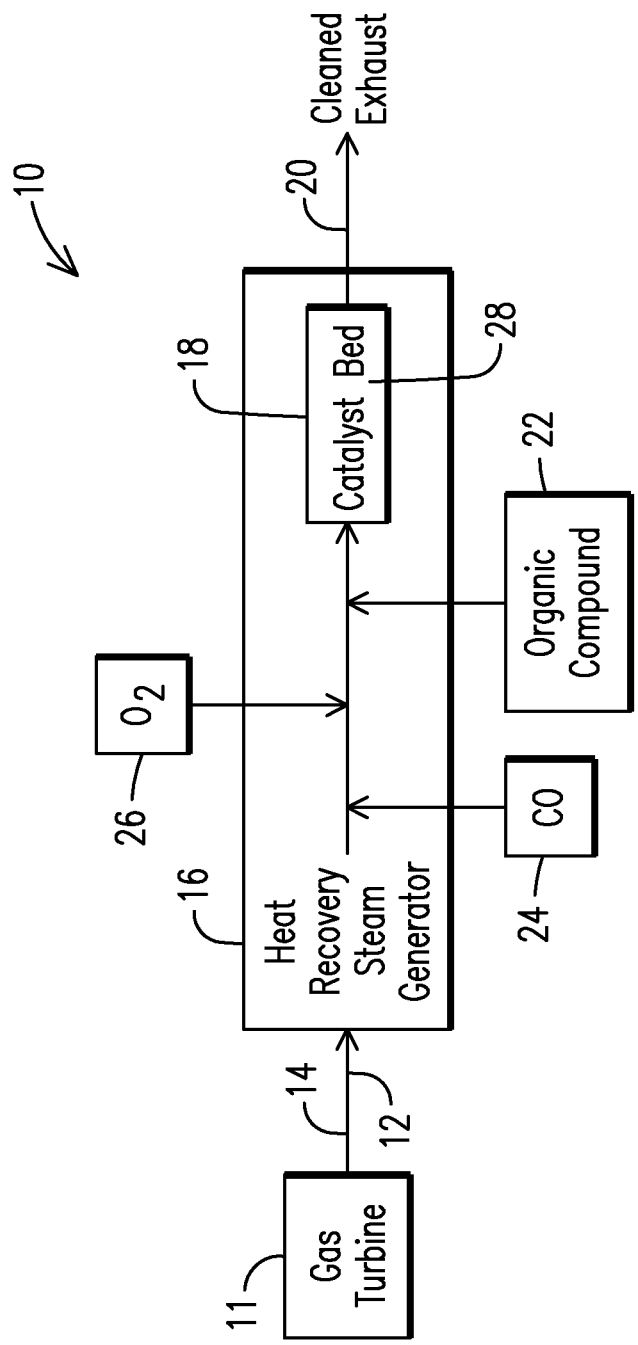
FIG. 1 is a schematic view of a system for carrying out a process for reducing $NO_2$ to NO in accordance with an aspect of the present invention.

In one aspect, the present inventor has surprisingly found that the presence of effective amounts of both carbon monoxide and an organic compound in a $NO_2$-containing gaseous stream synergistically improves the efficiency of the reduction of $NO_2$ to NO over a platinum group catalyst relative to that of known methods and relative to the use of the reducing agents (CO and an organic compound) individually. Advantageously, the processes and systems described herein may achieve about 75% and even up to about 99% $NO_2$ reduction efficiency across a low to high temperature range, such as from about 50° C. to about 600° C. In particular embodiments, the processes provide high efficiencies at low temperatures (less than about 150° C.), thereby providing an excellent $NO_2$ reduction tool during start up of a gas turbine or its operation at low loads. In addition, the present inventor has found that certain organic compounds, utilized with or without CO, can provide excellent reduction efficiencies for $NO_2$ across a range of temperatures. In particular embodiments, the organic compound may comprise an alcohol, such as methanol; an aldehyde such as formaldehyde; and/or an aromatic hydrocarbon, such as toluene. As described in detail below, these particular organic compounds had particularly surprising results, with or without CO, to reduce $NO_2$ to NO.

Further, the present inventor has surprisingly found that organic compounds, including hydrocarbons, and carbon monoxide, if present, in the subject gaseous stream can also be efficiently oxidized to $CO_2$ and water, particularly at temperatures greater than about 150° C. CO oxidation efficiency may, in fact, reach levels of about 90% at about 270° C., and higher oxidation efficiencies may be realized in the range of about 420° C. to about 600° C. Thus, the processes and systems described herein can substantially reduce $NO_2$ levels, particularly at low temperatures, e.g., less than about 150° C., and can reduce $NO_2$, CO, and organic compound emissions across a large temperature range of about 150° C. to about 600° C., thereby resulting in a substantially cleaned gaseous stream.

As used herein, the term "about" refers to values that are ±1% of the stated value.

As used herein, the term "aldehyde" refers to a compound comprising at least one unsaturated carbonyl group (C=O).

As used herein, the term "alcohol" refers to a compound comprising at least one carbon bonded to at least one hydroxyl group.

As used herein, the terms "amount effective," "effective amount," or the like means an amount or concentration necessary to achieve the desired result(s).

As used herein, the term "aromatic hydrocarbon" preferably means a molecule comprising carbon atoms and hydrogen atoms, and having one or more aromatic rings.

As used herein, the term "organic compound" refers to a carbon-based compound. It is noted, however, that the term "organic compound" does not include carbon-based molecules that are considered inorganic, such as carbon monoxide, carbon dioxide, carbonates, cyanides, cyanates, carbides, and thyocyanates.

In one aspect of the present invention, there is provided a process for reducing $NO_2$ to NO in a $NO_2$-containing gaseous stream. The process comprises contacting the gaseous stream with a catalyst bed comprising a catalyst selected from a platinum group metal in the presence of (a) carbon monoxide; (b) an organic compound; or (c) carbon monoxide and an organic compound. FIG. 1 illustrates an exemplary system for carrying out this process. It is understood, however, that the invention is neither so limited to the illustrated system of FIG. 1 nor are all shown components in FIG. 1 required. It would be readily appreciated by one skilled in the art that a greater or lesser number of components may be utilized.

Referring again to FIG. 1, there is shown a system 10 comprising a gas turbine 11 that produces a gaseous stream 12, e.g., exhaust gas 14, which comprises $NO_2$ and which may be directed to a heat recovery steam generator (HRSG) 16 as is known in the art, which includes or is otherwise located upstream of a catalyst bed 18 (or SCR bed 18). Typically, the catalyst bed 18 is positioned at a location suitable for a desired SCR temperature operating range. The exhaust gas 12 passes to the catalyst bed 18 where one or more catalysts promote the reduction of $NO_2$ to NO and the oxidation of CO and organic compounds to $CO_2$ and water in the presence of an organic compound and/or CO as shown. Alternatively, the reduction of $NO_2$ to NO may take place in the presence of the organic compound or CO individually, and the excess organic compound or CO may be oxidized. A cleaned exhaust gas 20 is emitted from an outlet of the SCR bed 18.

To provide the organic compound to the exhaust stream 12, the system 10 optionally includes one or more injectors for injecting the organic compound into the exhaust stream 14 from a suitable organic compound source. It is understood that in certain embodiments, a sufficient amount of CO for the reaction may already be included within the exhaust stream 12. Alternatively, one or more injectors for injecting all or a portion of the required carbon monoxide 24 into the exhaust stream 14 from a suitable CO source may also be provided as shown. In certain embodiments, oxygen 26 may further be added to the exhaust stream 14 via one or more injectors as shown. Optionally also, a controller may be associated with one or more sensors and valves to sense the amount of carbon monoxide and/or organic compound present in the gaseous stream 12 at any location and point in time (not shown). In this way, the controller may maintain desired amounts of the components in the gaseous stream 12. As is described in more detail below, the catalyst bed 18 comprises a catalyst system 28 having long-term stability for reducing $NO_2$ to NO, and optionally oxidizing organic compounds and CO to $CO_2$ and water, when exposed to the exhaust stream 14.

Although the gaseous stream 12 comprises a flowing exhaust stream 14 that is the result of a combustion process in FIG. 1, it is understood that the gaseous stream 12 may comprise any other gaseous phase or a mixture of a gaseous and a liquid phase comprising at least an amount of $NO_2$—whether flowing or stationary. It is also appreciated that the gaseous stream 12 may include other components, such as carbon monoxide, carbon dioxide, molecular nitrogen, water vapor, molecular oxygen, O-, S-, and N-containing compounds, and incompletely combusted fuel, for example. The catalyst bed 18 comprising a catalyst system 28 may be disposed in any suitable form. In one embodiment, the catalyst bed 18 is a selective catalytic reduction (SCR) bed as is well-known in the art. The catalyst bed 18 may be in a geometric form that allows for high $NO_x$ reduction efficiency along with a minimal pressure drop. Although beads, extrudates, etc. are suitable geometric forms employed in commercial applications, a monolith is a preferred form. The monolithic form and the use of a monolith as a catalyst carrier are well known to one skilled in the art. A monolith comprises a series of straight, non-interconnecting channels. Typically, a thin layer of a catalyst-containing material, termed "washcoat" by the trade, is coated onto the walls of the monolith.

In certain embodiments, the catalyst system 28 may comprise at least one catalyst, a binder, washcoat particles, and optionally, a promoter. The catalyst may comprise one or more members of the platinum group metals, namely ruthenium, rhodium, palladium, osmium, iridium, and platinum. In one embodiment, the catalyst comprises one or more of the palladium-group platinum group elements (Rh, Pt, Pd). In a particular embodiment, the catalyst comprises platinum. It is appreciated that additional catalysts known in the art may be included in the catalyst system 28. The inventor has found that a catalyst system comprising at least a platinum catalyst provides optimum results for reducing $NO_2$, and also for oxidizing CO and organic compounds. Typically, the catalyst is provided in an amount effective to optimally facilitate the reduction of $NO_2$ to NO, and also the oxidation of CO to $CO_2$ and organic compounds to $CO_2$ and water. In one embodiment, the platinum group catalyst is provided in an amount from about 0.5 to about 20 wt % of the catalyst bed 18, and in a particular embodiment from about 0.5 to about 5 wt % of the catalyst bed 18.

The washcoat particles may be any suitable particles known in the art, such as well-known metal oxide (e.g., Al, Mg, and/or Si oxides) or zirconia-based washcoat particles. In one embodiment, the washcoat particles comprise alumina particles. In another embodiment, the washcoat particles comprise zirconia, sulfated-zirconia, and/or sulfated-zirconia-silica oxides.

Binders may be used to adhere the solid catalyst support material to the substrate, e.g., monolithic substrate. Conventional binders include clays, aluminas, silicas, zirconias, and the like. In one embodiment, the binder comprises a pre-sulfated zirconia binder as was described in U.S. Patent Application Publication No. 20090285735, the entirety of which is hereby incorporated by reference. The binder may be provided in the catalyst system 28 in any suitable quantity, such as a mass ratio of the binder to the catalyst system of between about 0.001 and about 0.04.

Optionally, the catalyst system 28 may also comprise a promoter. The promoter may comprise one of tungsten, zinc, titanium, and combinations thereof, for example. In one embodiment, the promoter is tungsten and the tungsten loading is in the range of from about 0.5 to about 5.0 wt. % of the catalyst system 28. It is appreciated that the addition of a small amount of a promoter may aid in reducing the oxidation efficiency of the catalyst when desired.

The present inventor has found that effective amounts of carbon monoxide, an organic compound, or an organic compound and carbon monoxide, significantly improve the reduction efficiency of the conversion of $NO_2$ to NO over a platinum group metal catalyst, particularly at low temperatures (about 150° C. or less). In certain embodiments, the reduction of $NO_2$ to NO takes place in the presence of effective amounts of both an organic compound and carbon monoxide. The present inventor has surprisingly found that the presence of effective amounts of both carbon monoxide and an organic compound in a $NO_2$-containing gaseous stream dramatically improves the reduction efficiency of the conversion of $NO_2$ to NO over a platinum group catalyst relative to that of known methods and relative to the use of the reducing agents (CO and an organic compound) individually. As shown in the Examples below, for example, 75 ppm of CO alone at 50° C. provided a reduction efficiency of 0% (See Table 1) while 10 ppm of toluene alone at 50° C. provided a reduction efficiency of 31% (See Table 2). Added together, however, 75 ppm of CO and 10 ppm of toluene at 50° C. provided a substantially greater than additive effect and synergistically provided a reduction efficiency of 98% (See Table 3). These results show that, in one aspect, effective amounts of CO and an organic compound may be utilized to reduce $NO_2$ to NO over a platinum group catalyst even at very low temperatures, e.g., 50° C. As shown in Examples 5 and 6, effective amounts of methanol and formaldehyde, respectively, in combination with an effective amount of CO also provided desirable results.

In addition, the present inventor has found that the reduction efficiency may be improved over known methods, with or without CO, when the organic compound is in the form of an alcohol, an aldehyde, and/or an aromatic hydrocarbon, such as one or more of methanol, formaldehyde, and/or toluene. In contrast, the inventor found that certain aliphatic hydrocarbons, such as methane, did not provide the same optimal reduction efficiencies for $NO_2$. In one embodiment, the organic compound comprises an alcohol, and the alcohol comprises methanol. In another embodiment, the organic compound comprises an aldehyde, and the aldehyde comprises formaldehyde. In still another embodiment, the organic compound comprises an aromatic hydrocarbon, and the aromatic hydrocarbon comprises toluene.

The amount of the organic compound present should be any amount effective to reduce an amount of $NO_2$ to NO with a greater efficiency than without the organic compound. In one aspect, when the gaseous stream 12 is in contact with the catalyst bed 18, the amount of the organic compound in the gaseous stream 12 is at least 1 ppm, and in a particular embodiment is at least 5 ppm.

If present, the amount of CO present for the reduction of NO to $NO_2$ is at least an amount effective to increase the reduction efficiency of $NO_2$ to NO relative to the reduction efficiency of $NO_2$ to NO of the associated process without CO. In one embodiment, the amount of the CO in the gaseous stream 12 present during the contacting of the gaseous stream with the catalyst is at least about 5 ppm. In a particular embodiment, the amount of the CO present is at least about 75 ppm. In embodiments where both CO and an organic compound are utilized for the reduction of $NO_2$ to NO, the ratio of the CO to the organic compound present may be any suitable amount effective to reduce an amount of $NO_2$ to NO. In one embodiment, the ratio of CO to organic compound is at least about 2:1. This may be based upon the ppm of each component in the gaseous stream 12, although the invention is not so limited.

It is appreciated that in certain embodiments, a portion of CO and/or the organic compound for the reduction of $NO_2$ to NO may already be present in the gaseous stream 12, particularly when the gaseous stream 12 is an exhaust stream 14 from the combustion of a natural gas-containing fuel. Thus, it is contemplated that, in certain embodiments, a portion of the CO and/or the organic compound may not be required to be intentionally added to the gaseous stream 12, e.g., exhaust stream 14, as was shown in FIG. 1. In a particular embodiment, when CO is also used as a reducing agent, the effective amount of CO for the reduction of $NO_2$ to NO is already present in the exhaust stream 14.

Advantageously, the reduction of $NO_2$ and NO may take place over a wide range of temperatures. In one embodiment, aspects of the present invention are particularly beneficial in reducing $NO_2$ to NO at a temperature of from about 50° C. to about 600° C. In a particular embodiment, the contacting of the gaseous stream 12 with the catalyst bed 18 in the presence of CO, an organic compound, or CO and an organic compound, is done at a temperature of about 150° C. or less. In this way, the reduction of $NO_2$ utilizing CO and/or an organic compound, and a platinum group metal catalyst can occur at temperatures associated with the start up of a combustion engine or its operation at part or low loads where $NO_2$ levels are generally relatively high. As can be seen in the examples below, the reduction efficiency of $NO_2$ to NO rapidly increases starting from 50 to 75° C. in the presence of CO, an organic compound, or CO and an organic compound, over a platinum group catalyst. Thus, the reduction efficiency can be very high even at lower temperatures.

It is appreciated that at least a portion to all of an effective amount of oxygen may already be present in the gaseous stream 12. In one embodiment, the oxygen is added to the gaseous stream 12 at a point upstream from the catalyst bed 18 as was shown in FIG. 1; however, it is understood that the present invention is not so limited. In certain embodiments, the effective amount of oxygen is at least about 1% by volume of the gaseous stream 12. In other embodiments, the amount of oxygen may be at least about 10% by volume of the gaseous stream.

While the present inventors have found that the presence of CO in combination with an organic compound aids in reducing $NO_2$ to NO, it may also be desirable for excess of the organic compound(s), any byproducts, such as hydrocarbons, and CO in the gaseous stream 12 to be oxidized before release into the environment. The presence of oxygen in certain embodiments thus assists in the oxidation of the organic compound(s) and CO to a product comprising $CO_2$. As shown in the examples below, for example, the CO and the organic compound rapidly increase $NO_2$ to NO reduction efficiency at temperatures of about 150° C. or less. At a temperature of about 150° C., the conversion efficiency of $NO_2$ to NO plateaus and the conversion of CO to $CO_2$ rapidly increases until about 300° C., and then even further increases at a temperature of from about 400 to about 600° C. Thus, at temperatures lower than about 150° C., the CO aids in the reduction of $NO_2$ to NO. Thereafter, particularly at temperatures of about 150 to about 600° C., CO (and also organic compounds) may be oxidized to a product comprising $CO_2$.

In view of the above, there are provided numerous systems and processes for reducing $NO_2$ to NO in a $NO_2$-containing gaseous stream, which are particularly useful at the low temperatures associated with start up of a gas turbine and its operation at low or part loads to reduce yellow plume. In one aspect, there is provided a process for reducing $NO_2$ to NO in a $NO_2$-containing gaseous stream. The process comprises contacting the gaseous stream with a catalyst system comprising a catalyst selected from a platinum group metal. The contacting is done in the presence of at least an organic compound, and in certain embodiments, CO and an organic compound. The carbon monoxide and/or the organic compound may be present in an amount effective to reduce $NO_2$ to NO in the gaseous stream with a reduction efficiency of at least about 75%. In certain embodiments, the reduction efficiency is at least about 90%, and in further embodiments is at least about 98%. In one aspect, the reduction takes place at a temperature of about 150° C. or less, which is particularly suitable to reduce $NO_2$ emissions at start up or part load of a gas turbine. In certain embodiments, the organic compound is selected from the group consisting of an alcohol, an aldehyde, an aromatic hydrocarbon, and combinations thereof. In a particular embodiment, the organic compound may be selected from the group consisting of methanol, formaldehyde, toluene, and combinations thereof.

In accordance with another aspect, there is provided a process for reducing $NO_2$ to NO in a $NO_2$-containing gaseous stream. The process comprises contacting the gaseous stream with a catalyst system comprising a catalyst selected from a platinum group metal in the presence of an effective amount of an organic compound. The organic compound may be selected from the group consisting of an alcohol, an aldehyde, and an aromatic hydrocarbon, such as methanol, formaldehyde, and toluene, respectively.

In accordance with another aspect, there is provided a process for reducing $NO_2$ to NO in a $NO_2$-containing gaseous stream. In this embodiment, the process comprises intentionally adding an amount of a CO and/or an organic compound to the gaseous stream. The process also includes contacting the gaseous stream with a catalyst system comprising a catalyst selected from a platinum group metal, wherein the catalyst, carbon monoxide, and/or organic compound are present in an amount effective to reduce an amount of $NO_2$ to NO in the gaseous stream.

Although the above invention was described in the context of the power generation field with specific emphasis on the treatment of gas turbine exhaust, the novel processes as described herein may be applied to other $NO_x$ pollution sources comprising an amount of $NO_2$, such as for example nitric acid plants and stationary emissions sources, with different system configurations.

In any of the embodiments contemplated herein, the processes may further comprise oxidizing an amount of CO to $CO_2$ and/or organic compounds in the exhaust stream to $CO_2$ and water in the presence of oxygen to lower an amount of CO and/or organic compounds in the gaseous stream 12, particularly before release of the gaseous stream 12 to the atmosphere in the case of an exhaust gas 14. In certain embodiments, the reduction efficiency of the conversion of $NO_2$ to NO rapidly increases at a temperature of about 50° C. to about 150° C. while the oxidation efficiency of the conversion of CO to $CO_2$ and organic compounds to $CO_2$ and water rapidly increases at a temperature of from 150 to 300° C. and may be carried out to 600° C.

The below examples are provided to illustrate certain aspects of the present invention and are not intended to be limiting in any respect.

EXAMPLE 1

The preparation of a catalyst bed having 5.0 g $Pt/ft^3$ on a monolith substrate was prepared. The prepared catalyst bed was then utilized to generate the data in each of the following examples. First, a platinum metal solution was prepared by adding to a beaker 0.13 g tetraamine platinum chloride (55.46% Pt), 0.3 g TEA (Triethanolamine, Ashland), and the resulting solution was diluted to 50 g total with deionized (DI) water. Monolithic honeycomb substrate had 110 CPSI (cells per square inch) and had in its composition primarily Al, Mg, and Si oxides. The monolith block was dipped in the platinum solution. The calculated loading on monolith substrate was 5.2 g $Pt/ft^3$. Thereafter: 1) the block was microwave dried; 2) the block was placed in a furnace at 250° C.; 3) the furnace was ramped to 450° C. at a rate of 50° C./hr; 4) the temperature was held at 450° C. for 2 hours; and 5) the furnace was ramped to 100° C. at a rate of about 35° C./hr.

EXAMPLE 2

CO Alone as Reducing Agent

Figure 2:
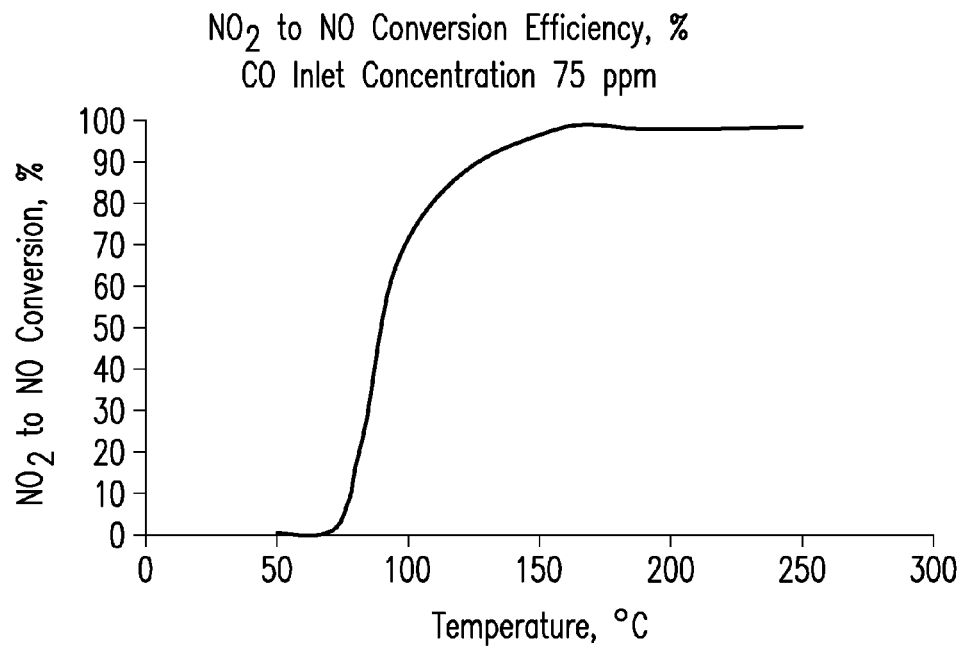
FIG. 2 shows the $NO_2$ to NO conversion efficiency with an inlet CO concentration of about 75 ppm.

Example 2 illustrates the conversion of $NO_2$ to NO when CO alone is used as the reducing agent. The results and conditions are shown in FIG. 2 and Table 1 below. As shown in FIG. 2, with an inlet concentration of 75 ppm CO, the $NO_2$ to NO conversion efficiency dramatically increases from 75 to 150° C. To generate the data in FIG. 2 and Table 1, the above-described Pt catalyst was used; inlet concentration of NOx was 20 ppm; 80% of $NO_2$ was in the $NO_x$ mixture; GHSV was about 20,000 $hr^{-1}$; and $O_2$ concentration was about 10% by vol.; and the balance was $N_2$.

Table 1. Influence of CO concentration in the flow on $NO_2$ to NO % Conversion Efficiency (%)

| CO, | % $NO_2$ Reduction Efficiency at Temperature, ° C. | |
| --- | --- | --- |
| Ppm | 50 | 75 |
| 75 | 0 | 3 |
| 100 | 3 | 8 |
| 150 | 7 | 86 |
| 200 | 37 | 99 |

EXAMPLE 3

Toluene as Reducing Agent

Next, the influence of toluene concentration in the flow and temperature on NO to $NO_2$ conversion efficiency (%) was determined by varying the toluene concentration and temperature under the conditions described below in Table 2.

2. Influence of toluene concentration in the flow on $NO_2$ to NO % Conversion Efficiency; Pt Catalyst; Inlet concentration of NOx 20 ppm; 80% of $NO_2$ in the NOx mixture; GHSV ~20,000 $hr^{-1}$; $O_2$ ~10% by vol.; and the balance was $N_2$.

| Toluene, | % $NO_2$ Reduction Efficiency at Temperature, ° C. | |
| --- | --- | --- |
| ppm | 50 | 75 |
| 1 | 0 | 1 |
| 5 | 0 | 90 |
| 10 | 31 | 99 |
| 20 | 99 | 99 |

EXAMPLE 4

Toluene and CO as Reducing Agents

Next, the synergistic effect of the concentration of toluene and CO in the flow on NO to $NO_2$ conversion efficiency (%) was determined by varying the toluene concentration and temperature under the conditions described below in Table 3. Table 3. Synergetic effect of CO and toluene in the flow on $NO_2$ to NO Conversion Efficiency; Pt Catalyst; Inlet concentration of $NO_x$ 20 ppm; 80% of $NO_2$ in the $NO_x$ mixture; GHSV ~20,000 $hr^{-1}$, $O_2$ ~10% by vol.; and the balance was $N_2$.

| CO | Toluene | % $NO_2$ Reduction Efficiency at Temperature, ° C. | |
| --- | --- | --- | --- |
| Ppm | ppm | 50 | 75 |
| 75 | 5 | 24 | 99 |
|  | 10 | 98 | 99 |

As shown, 75 ppm of CO alone at 50° C. provided a reduction efficiency of 0% (See Table 1) while 10 ppm of toluene alone at 50° C. provided a reduction efficiency of 31% (See Table 2). Critically, 75 ppm of CO and 10 ppm of toluene at 50° C. provided a substantially greater than additive effect and synergistically provided a reduction efficiency of 98% (See Table 3). This was a dramatic increase in efficiency. Also, 75 ppm of CO alone at 75° C. provided a reduction efficiency of 3% (See Table 1) while 5 ppm of Toluene alone at 75° C.

provided a reduction efficiency of 90% (See Table 2). Added together, however, 75 ppm of CO and 5 ppm of toluene at 75° C. also provided a greater than additive effect and synergistically provided a reduction efficiency of 99% (See Table 3).

EXAMPLE 5

Methanol and CO as Reducing Agents

Next, the influence of methanol and CO concentration in the flow and temperature on NO to $NO_2$ conversion efficiency (%) was determined by varying the methanol concentration and temperature under the conditions described below in Table 4.

Table 4. Synergetic effect of CO and methanol in the flow on $NO_2$ to NO Conversion Efficiency; Pt Catalyst; Inlet concentration of NOx 20 ppm; 80% of $NO_2$ in the NOx mixture; GHSV ~20,000 $hr^{-1}$; $O_2$ ~10% by vol.; and the balance was $N_2$.

| CO, | Methanol, | % $NO_2$ Reduction Efficiency at Temperature, ° C. | |
|---|---|---|---|
| Ppm | ppm | 75 | 100 |
| 75 | 10 | 2 | 49 |
|  | 20 | 19 | 90 |
|  | 40 | 66 | 99 |
| 150 | 10 | 5 | 59 |
|  | 20 | 32 | 97 |

EXAMPLE 6

Formaldehyde and CO as Reducing Agents

Next, the influence of formaldehyde and CO concentration in the flow and temperature on NO to $NO_2$ conversion efficiency (%) was determined by varying the formaldehyde concentration and temperature under the conditions described below in Table 5.

Table 5. Synergetic effect of CO and formaldehyde in the flow on $NO_2$ to NO Conversion Efficiency; Pt Catalyst; Inlet concentration of $NO_x$ 20 ppm; 80% of $NO_2$ in the $NO_x$ mixture; GHSV ~20,000 $hr^{-1}$; $O_2$ ~10% by vol.; and the balance was $N_2$.

| CO, | Formaldehyde, | % $NO_2$ Reduction Efficiency at Temperature, ° C. | |
|---|---|---|---|
| Ppm | ppm | 75 | 100 |
| 75 | 25 | 2 | 49 |
|  | 50 | 19 | 90 |

EXAMPLE 7

Figure 3:
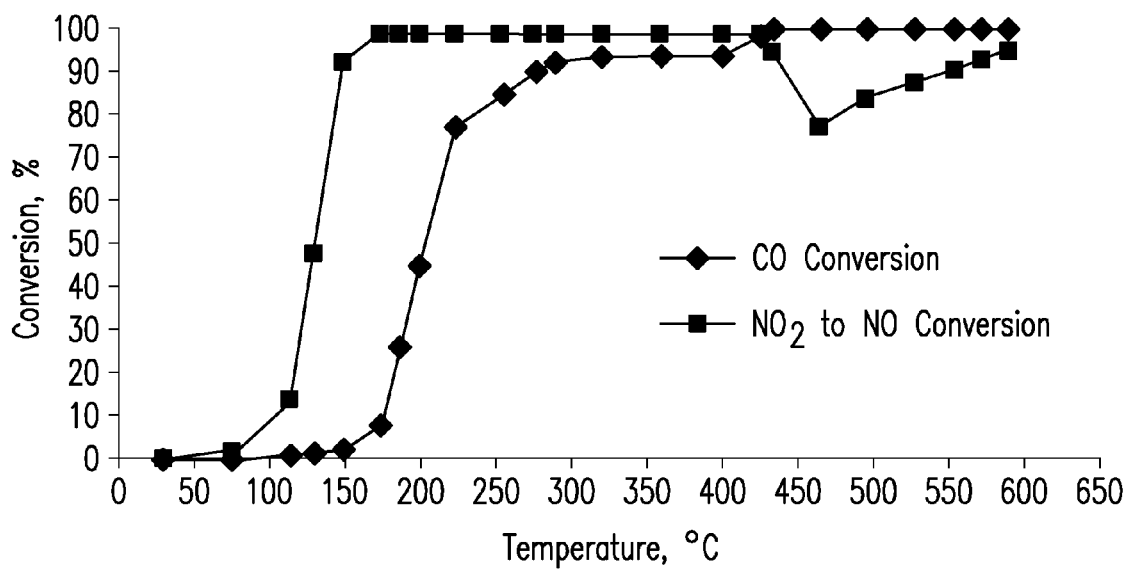
FIG. 3 is a graph showing $NO_2$ to NO reduction efficiency (when CO is used as a reducing agent) and CO to $CO_2$ conversion efficiency versus temperature at transient conditions (about 1.4° C./minute).

The $NO_2$ to NO conversion efficiency (%) when CO is used as a reduction agent (160 ppm) and CO conversion efficiency (%) versus temperature was measured at transient conditions (1.4° C./min). The results are fully shown in FIG. 3. The conditions were: Pt Catalyst; Inlet concentration of NOx 20 ppm; 80% of $NO_2$ in the NOx mixture; GHSV ~20,000 $hr^{-1}$, $O_2$ concentration was ~10% by vol.; and the balance was $N_2$. As shown, the reduction of $NO_2$ to NO rapidly increases at temperatures from 50 to 150° C. while the oxidation of CO to $CO_2$ rapidly increases at temperatures ranging from 150 to 300° C. At temperatures of from 300° C. or more, both $NO_2$ is reduced and CO is oxidized at favorable efficiencies.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for reducing nitrogen dioxide ($NO_2$) to nitric oxide (NO) in a $NO_2$-containing gaseous stream comprising:
   contacting the gaseous stream with a catalyst system comprising a catalyst selected from a platinum group metal at a temperature of about 150° C. or less and in the presence of an amount of carbon monoxide and an organic compound effective to reduce $NO_2$ to NO with an efficiency of at least 75%.

2. The process of claim 1, wherein the organic compound is selected from the group consisting of an alcohol, an aldehyde, an aromatic hydrocarbon, and combinations thereof.

3. The process of claim 2, wherein the organic compound is selected from the group consisting of methanol, formaldehyde, toluene, and combinations thereof.

4. The process of claim 1, wherein an amount of the carbon monoxide present is at least about 5 ppm, and wherein an amount of the organic compound present is at least about 1 ppm.

5. The process of claim 2, wherein the amount of the carbon monoxide present is at least about 75 ppm, and wherein the amount of the organic compound present is at least about 5 ppm.

6. The process of claim 1, wherein a ratio of ppm of carbon monoxide to ppm of organic compound is at least about 2:1.

7. The process of claim 1, wherein the contacting is further done in the presence of oxygen, and wherein the process further comprises oxidizing an amount of the carbon monoxide and an amount of the organic compound in the gaseous stream to a product comprising carbon dioxide.

8. The process of claim 7, wherein the oxidizing is done at a temperature of from about 150 to about 600° C.

9. The process of claim 1, wherein the presence of carbon monoxide is provided by intentionally adding an amount of the carbon monoxide to the gaseous stream.

10. The process of claim 1, wherein the platinum group metal comprises platinum.

11. A process for reducing $NO_2$ to NO in a $NO_2$-containing gaseous stream comprising:
   contacting the gaseous stream with a catalyst system comprising a catalyst selected from a platinum group metal in the presence of an effective amount of carbon monoxide and an organic compound selected from the group consisting of an alcohol, an aldehyde, an aromatic hydrocarbon and combinations thereof.

12. The process of claim 11, wherein the organic compound is selected from the group consisting of methanol, formaldehyde, toluene, and combinations thereof.

13. The process of claim 11, wherein a ratio of ppm of carbon monoxide to ppm of organic compound is at least about 2:1.

14. The process of claim 11, wherein the contacting is further done in the presence of oxygen, wherein the process further comprises oxidizing an amount of the carbon monoxide and an amount of the organic compound in the gaseous stream to a product comprising carbon dioxide.

15. The process of claim 14, wherein the oxidizing is done at a temperature of from about 150° C. to about 600° C.

16. A process for reducing $NO_2$ to NO in a $NO_2$-containing gaseous stream comprising:
   contacting the gaseous stream with a catalyst system comprising a catalyst selected from a platinum group metal in the presence of an effective amount of an organic compound selected from the group consisting of an alcohol, an aldehyde, an aromatic hydrocarbon, and combinations thereof.

17. The process of claim 16, wherein the contacting is done at a temperature of about 150° C. or less.

18. The process of claim 16, wherein the contacting is further done in the presence of carbon monoxide.

19. The process of claim 18, wherein the process further comprises oxidizing an amount of the carbon monoxide and an amount of the organic compound in the gaseous stream at a temperature of from about 150° C. to about 600° C.

20. The process of claim 16, wherein the organic compound is selected from the group consisting of methanol, formaldehyde, toluene, and combinations thereof.

* * * * *